United States Patent
Matsler

[11] Patent Number: 5,810,286
[45] Date of Patent: Sep. 22, 1998

[54] LIGHTER-THAN-AIR AIRCRAFT

[76] Inventor: Winfield R. Matsler, 14 Spruce Dr., Belleville, Ill. 62221

[21] Appl. No.: 729,185

[22] Filed: Oct. 11, 1996

[51] Int. Cl.$^6$ ............................................. A64B 1/00
[52] U.S. Cl. ........................... 244/29; 244/52; 244/30; 244/26; 244/39
[58] Field of Search ................... 244/29, 52, 30, 244/12.2, 23 C, 26, 39

[56] References Cited

U.S. PATENT DOCUMENTS

| | | | |
|---|---|---|---|
| 1,838,248 | 12/1931 | Bourland | 244/26 |
| 2,567,392 | 9/1951 | Naught | 244/52 |
| 2,912,188 | 11/1959 | Singelmann et al. | 244/52 |
| 2,997,254 | 8/1961 | Mulgrave et al. | 244/12.2 |
| 3,048,353 | 8/1962 | Holmes | 244/23 C |
| 3,096,048 | 7/1963 | Yost . | |
| 3,103,327 | 9/1963 | Parry | 244/23 C |
| 3,110,457 | 11/1963 | Struble, Jr. . | |
| 3,120,932 | 2/1964 | Stahmer . | |
| 3,195,834 | 7/1965 | Huch . | |
| 3,229,932 | 1/1966 | Yost . | |
| 3,420,473 | 1/1969 | Krafft . | |
| 3,820,744 | 6/1974 | Denton . | |
| 4,014,483 | 3/1977 | MacNeill . | |
| 4,090,682 | 5/1978 | Parsons . | |
| 4,366,936 | 1/1983 | Ferguson . | |
| 4,711,416 | 12/1987 | Regips . | |
| 4,901,948 | 2/1990 | Panos | 244/52 |
| 5,096,141 | 3/1992 | Schley . | |

OTHER PUBLICATIONS

The Bulletin of the Lighter–Than–Air Society, "Buoyant Flight", Jul.–Aug., 1995, (3 pages) William J. White, Airships for the Future, 1975, pp. (front cover) 144, 145 and 146.

*Primary Examiner*—Robert J. Oberleitner
*Assistant Examiner*—Tien Dinh
*Attorney, Agent, or Firm*—Polster, Lieder, Woodruff & Lucchesi

[57] ABSTRACT

A stable and highly maneuverable lighter-than-air aircraft is provided. The aircraft includes a body portion which is supported beneath a balloon portion by a stem or axle. The balloon is fillable with a lighter-than-air gas and is sized to accept sufficient amounts of gas to make the aircraft buoyant. The balloon portion is rotationally fixed to the axle and the axle is rotationally journaled in the body. Thus, the balloon portion can rotate relative to the body portion and the body can selectively be rotated relative to the axle. A motor is housed in the body portion and is operable to propel the aircraft in a desired direction. The aircraft is operated such that the balloon portion rotates above the body portion without rotating the body portion. The rotation of the balloon portion provides stability to the aircraft and the ability for the body portion to rotate about the axle enables the aircraft to be highly maneuverable.

19 Claims, 4 Drawing Sheets

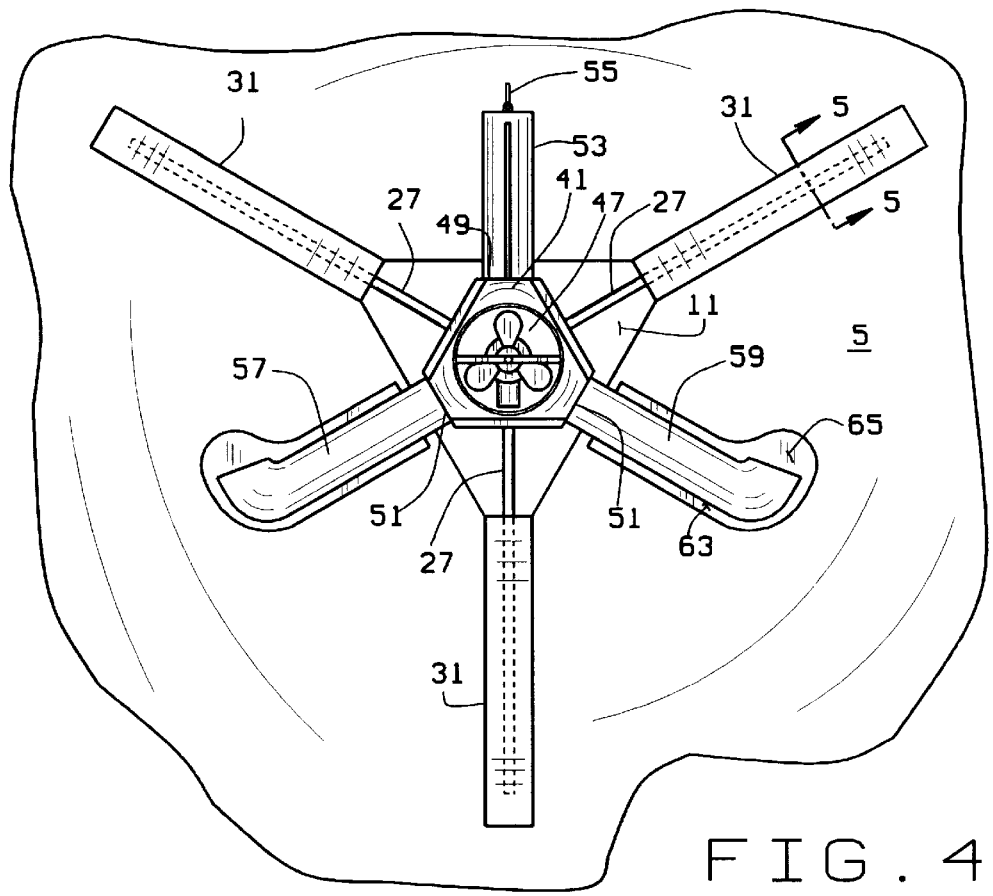
FIG. 4
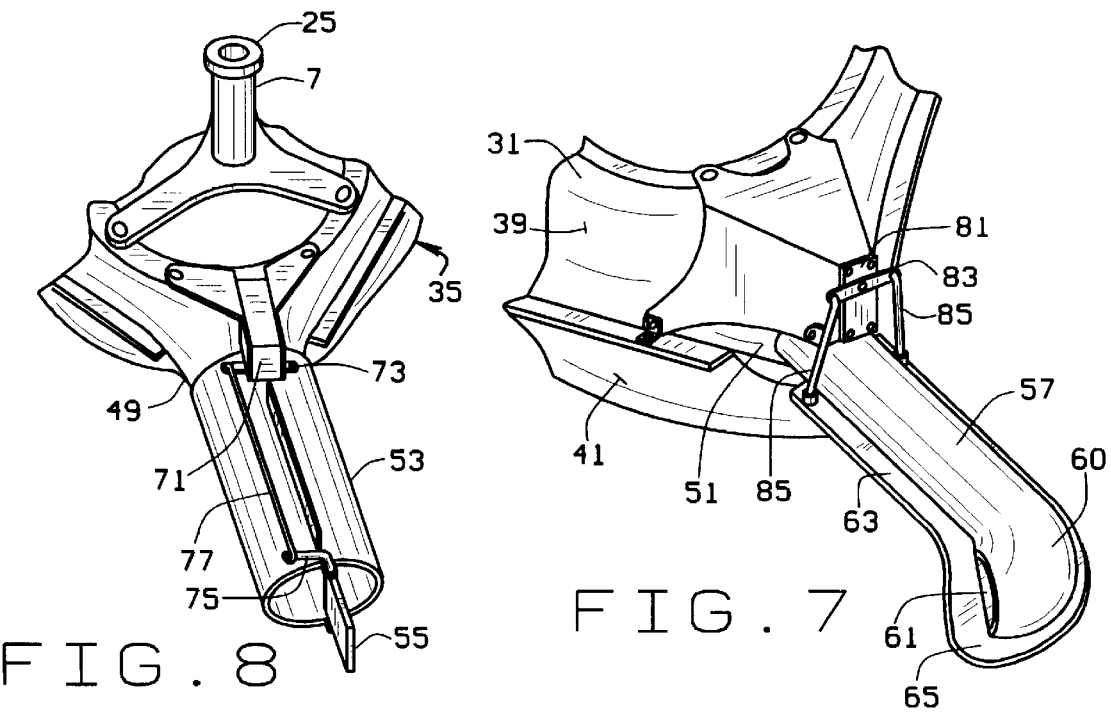
FIG. 8
FIG. 7

LIGHTER-THAN-AIR AIRCRAFT

BACKGROUND OF THE APPLICATION

This invention relates to lighter-than-air aircraft, and in particular to such an aircraft which is stable and highly maneuverable.

Lighter-than-air or buoyant aircraft typically include a balloon section, a means of propulsion, and a body section or fuselage carried beneath the balloon. Lighter-than-air aircraft have the advantage that they take little energy to ascend, and little energy to propel. Thus, in comparison to airplanes or helicopters, for example, lighter-than-air aircraft require less fuel to operate.

In lighter-than-air aircraft which do include propulsion means (hot air balloons are generally void of any propulsion means) the propulsion means is typically fixed to the balloon portion of the aircraft. This prevents the aircraft from being able to turn without moving in a horizontal plane, that is, the aircraft cannot turn in place. Further, the aircraft may not be as stable is it could be.

SUMMARY OF THE INVENTION

One object of the present invention is to provide an improved lighter-than-air aircraft.

Another object is to provide such an aircraft which is highly maneuverable.

Another object is to provide such an aircraft which is stable.

Another object is to provide such an aircraft in which the propulsion section is separate from and depends from the balloon section of the aircraft.

These and other objects will become apparent to those skilled in the art in light of the following disclosure and accompanying drawings.

In accordance with the invention, generally stated, a stable and highly maneuverable lighter-than-air aircraft is provided. The aircraft includes a body portion which is supported beneath a balloon portion by a stem or axle. The balloon is fillable with a lighter-than-air gas and is sized to accept sufficient amounts of gas to make the aircraft buoyant. The balloon portion is rotationally fixed to the axle and the axle is rotationally journaled in the body. Thus, the balloon portion can rotate relative to the body portion. A motor is housed in the body portion and is operable to propel the aircraft in a desired direction. The aircraft is operated such that the balloon portion rotates above the body portion without rotating the body portion. The rotation of the balloon portion provides stability to the aircraft and the ability for the body portion to rotate about the axle enables the aircraft to be highly maneuverable.

The body portion includes an air inlet, a rear thruster, and two side thrusters. The motor, which is preferably an impeller or jet motor, is operable to draw air in through the air inlet and to expel the air out the thrusters to propel the aircraft along a desired vector. The side thrusters each include an outlet and are operable to alter an angle of the outlet relative to the horizontal to alter the altitude of the aircraft. A rudder is pivotally mounted in the rear thruster to alter the direction of travel of the aircraft. Servomechanisms are provided to pivot the rudder and change the angle of the side thruster outlets. Preferably, the side thruster outlets are pivoted in unison so that they will always direct air along substantially the same vector.

As noted, the motor drives an impeller. The motor is rotationally fixed to the axle and the axle and impeller are on opposite sides of the motor. Thus, as the impeller rotates, it creates a counter-rotation in the motor which is passed to the balloon portion through the axle. Because the axle is rotatably journaled in the body portion, no counter rotation is induced in the body portion, and the body portion remains substantially positionally fixed. That is, the body portion only rotates when the rudder is operated to rotate the body to alter the direction of travel of the aircraft.

BRIEF DESCRIPTION OF THE DRAWINGS

FIG. 4 is a bottom plan view of the aircraft;

FIG. 7 is a perspective view of a side thruster of the aircraft; and

FIG. 8 is a perspective view of a rear thruster of the aircraft.

DESCRIPTION OF THE PREFERRED EMBODIMENT

Figure 1:
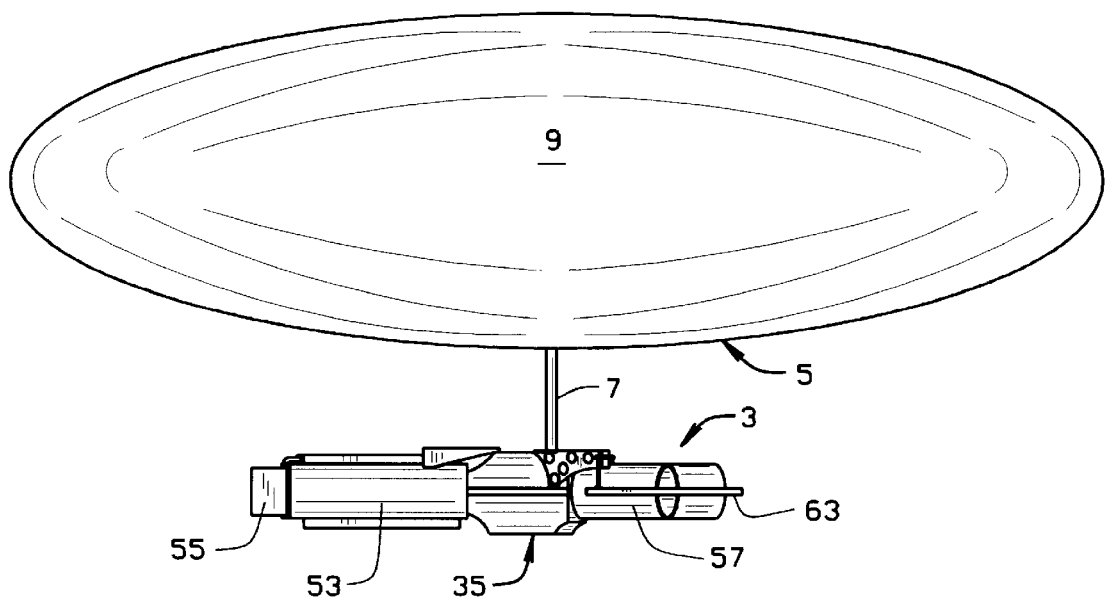
FIG. 1 is a side elevational view of a lighter-than-air aircraft of the present invention.

A lighter than air aircraft 1 of the present invention is shown generally in FIG. 1. The aircraft 1 includes a body portion 3 suspended from a balloon 5 by a stem or axle 7. The balloon 5 includes a skin or membrane 9 having an opening 11 (FIG. 4) at a bottom of the balloon. The balloon is filled with a gas which is lighter than air, for example helium, and is sized so that there is sufficient helium to off-set the weight of the body portion 3 and balloon 5 so that the aircraft 1 will be buoyant. Other gases, for example, hot air, could also be used.

Figure 6:
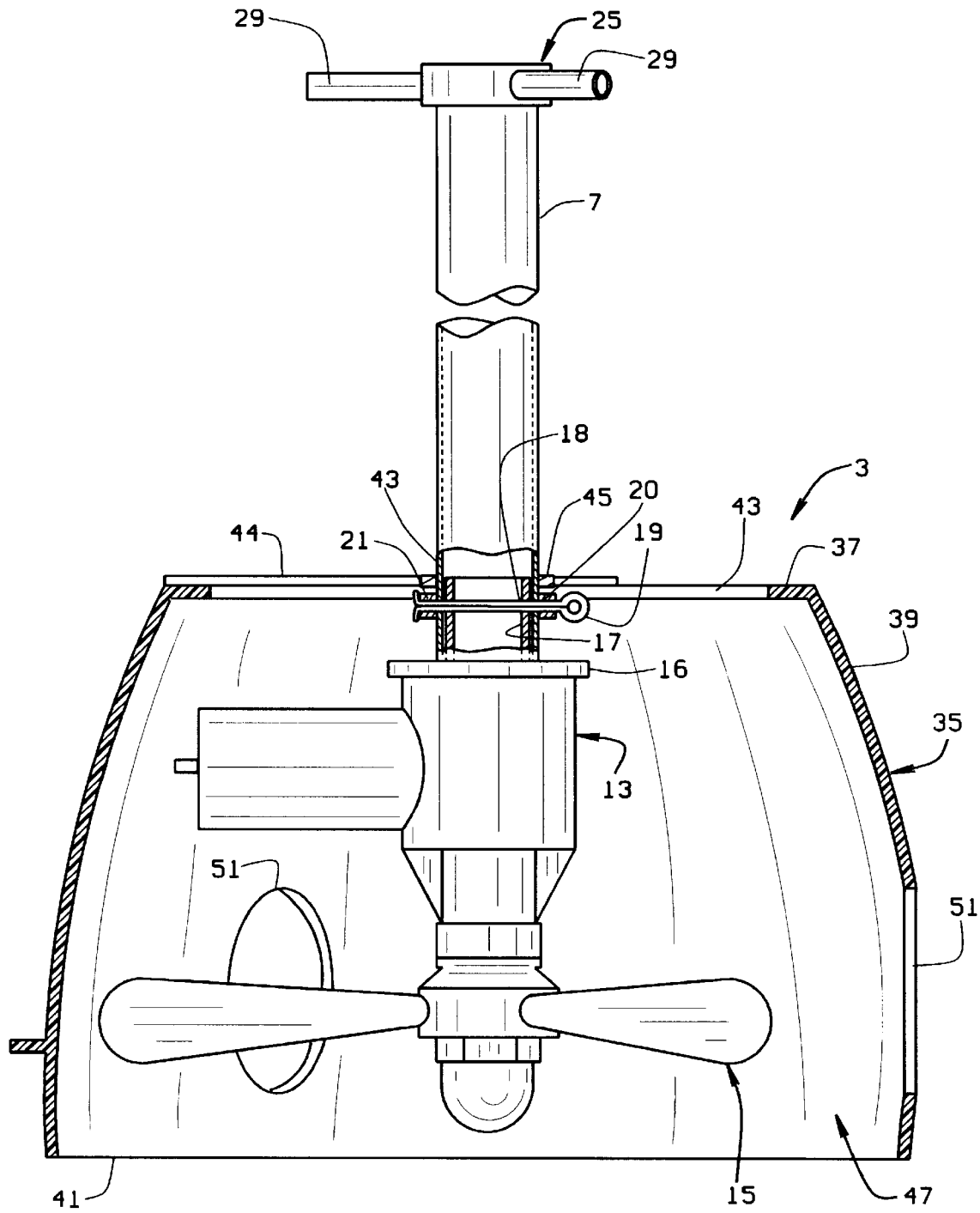
FIG. 6 is a cross-sectional view of the housing showing the manner of mounting of the housing on the motor.

The stem or axle 7 is secured to the top of a motor 13 (FIG. 6) which is contained within the body 3. The motor 13 shown is a gas powered motor, but may be any type of motor. For example, the motor may an electric or jet motor. The motor 13 includes an impeller 15 which is rotated by the motor to propel the aircraft 1, as will be described below. The axle 7 is fixed to the top of the motor. The motor 13 preferably includes a post 17 which extends upwardly from a mounting plate 16. The axle 7 is preferably hollow (at least at the bottom thereof) and is slid over the post 17. The post 17 and axle 7 include aligned pin holes 18 and 20, respectively, which accept a pin 19, such as a cotter pin, to secure the axle 7 to the post 17. The axle 7 thus cannot rotate with respect to the motor 13. Preferably, a ring 21 is mounted around the axle 7 at the level of the pin holes. The pin 19 thus passes through the ring 21 to hold the ring in place relative to the axle.

Figure 5:
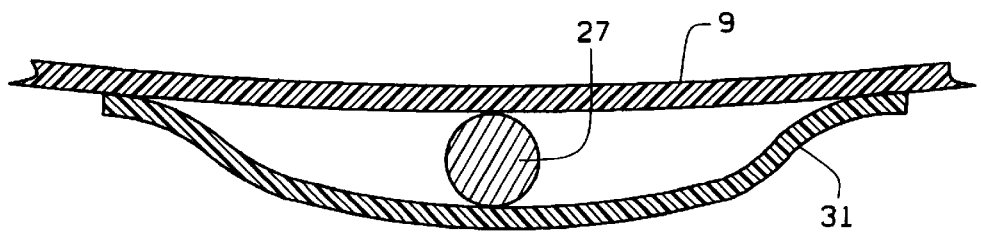
FIG. 5 is a cross-sectional view taken along line 5—5 of FIG. 4.

A hub 25 is formed or mounted at the top of the axle 7. A plurality of evenly spaced apart spokes 27 (FIG. 3) (three spokes are shown) extend outwardly from the hub. Preferably, the hub 25 includes bosses 29 (FIG. 6) which telescopically receive the spokes 27. The balloon 5 has sleeves 31 (FIGS. 4 and 5) which receive the spokes 27 to connect the balloon 5 to the axle 7. The sleeves 31 are formed of strips of elongate material which are connected to the outer skin 9 of the balloon 5 along their elongate sides. The sleeves 31 are preferably open at their ends. To mount the balloon 5 to the axle 7, the spokes 27 are passed through the balloon sleeves 31 and into the hub bosses 29. The hub 25 is fixed to the axle 7 so that the hub cannot rotate relative to the axle.

Figure 2:
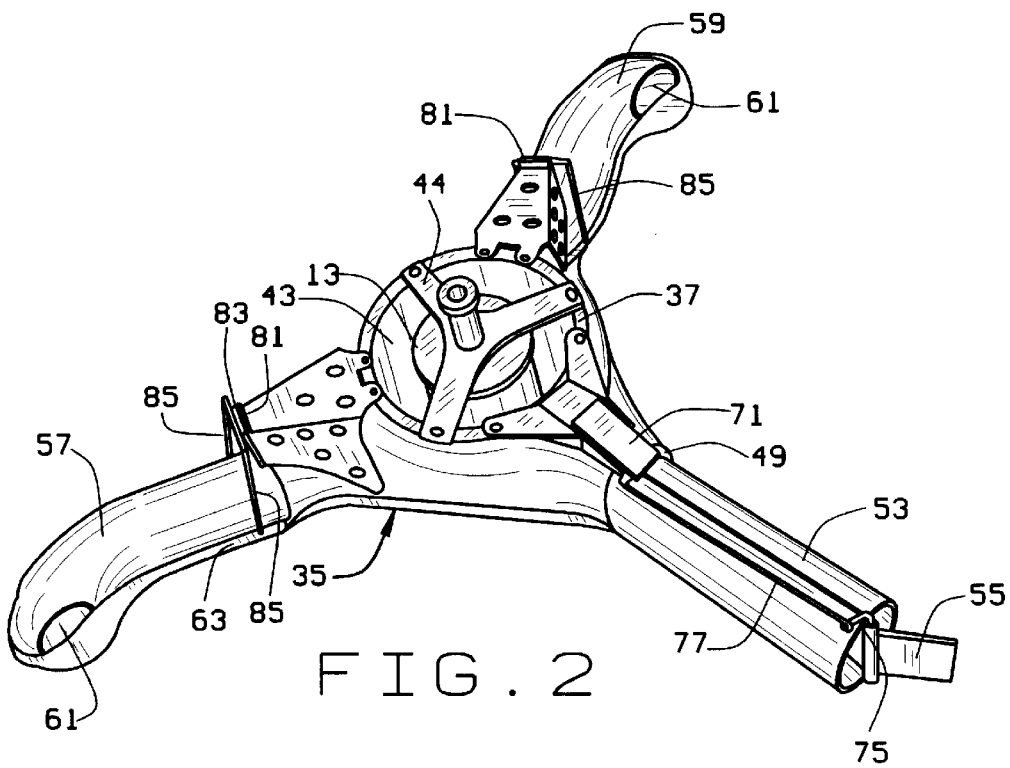
FIG. 2 is a perspective view of a body portion of the aircraft.

The body 3 includes a housing or manifold 35 (FIGS. 2 and 6) having a top surface 37, sides 39, and a generally opened bottom 41. The top surface 37 has an opening 43 through which the axle 7 extends. The manifold is not secured to the axle, but rather, rests on the ring 21. The axle 7 and the manifold 35 can thus pivot or rotate with respect to each other. If desired, a bearing 45 can be positioned between the edge of the opening 43 and the axle 7 to facilitate the pivotability of the manifold with respect to the axle 7. To center the axle 7 within manifold 35 so that it extends through the center of opening 43, a spider 44 having a central opening and a plurality of legs is secured to the top surface 37 of the manifold 35. The axle then extends through the opening in the spider 44, and the spider sits on the bearing 45.

The bottom 41 has an opening 47 which defines an air inlet to the manifold, and the sides 39 have three outlets: one back outlet 49 and two side outlets 51. As can be appreciated, the impeller 15 is spun by the motor in a direction that will bring air into the housing or manifold 35 and then will force the air out the outlets 49 and 51.

The rear outlet 49 has a tube 53 rotatably mounted thereto to define a rear thruster. The air expelled out the rear thruster will give the aircraft 1 forward momentum. A rudder 55 is pivotally mounted at the back of the tube 53 and is operable to be selectively pivoted. Thus, the direction of forward travel of the aircraft 1 can be controlled.

Figure 3:
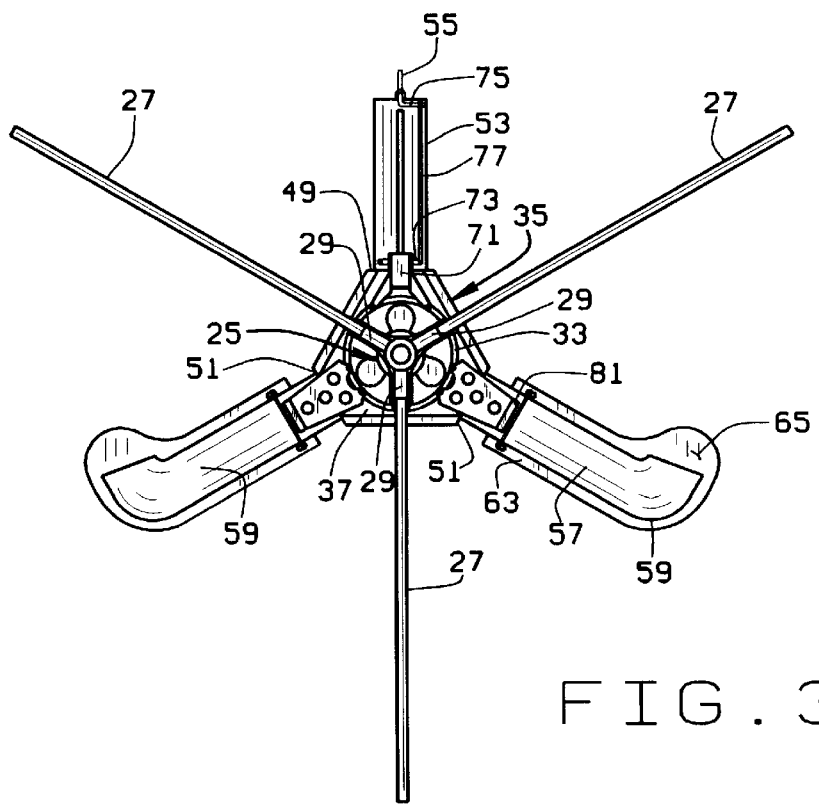
FIG. 3 is a top plan view of the aircraft, less the balloon.

Second and third tubes 57 and 59 extend from the side outlets 51 and are rotatably connected to the manifold 35 at the outlets to define side thrusters. The tubes 57 and 59 are identical. Each tube includes a bend or elbow 60 so that the outlet 61 of the tube will face generally rearwardly. Because the tubes are rotatably mounted to the body, the tubes can be rotated such that the outlet 61 will face generally above or below a horizontal plane. The thrust provided by the air passing out of the tubes 57 and 59 can be used to change the elevation of the aircraft 1. A axial plate or flange 63 extends around the tube and passes in front of the outlet 61. The flange 63 is formed or mounted on the tube to extend along the center of the tube. That is, it lies on a diameter of the tube. As noted, the flange 63 extends across the opening 61 of the tubes 57 and 59. The portion 65 of the flange 63 which passes across the opening 61 is enlarged, as can be seen in FIGS. 3 and 4. The flange portion 65 forms, in a sense, an immobile rudder which will help direct the flow of air out of the side thrusters 57 and 59.

Servomechanisms are provided to pivot the rudder 55 and rotate the side thrusters 57 and 59. A rear servomechanism 71 (FIG. 8) is mounted to the outside of the housing 35 above the rear outlet 49. A pivot plate 73 is connected to, and extends from, the servomechanism 71, such that when the servomechanism is activated, the plate will pivot in a selected direction (either clockwise or counter-clockwise) about an axis a desired amount. A tiller 75 is mounted to, and extends from the rudder 55 at a right angle thereto. A rod 77 is pivotally connected at one end to the pivot plate 73 and at another end to the tiller 75. The servomechanism is operated, as noted, to selectively pivot the pivot plate 73. As the pivot plate is turned or pivoted, the rod 77 will be pulled or pushed, resulting in pivoting of the rudder. The direction of movement of the aircraft can thus be selectively controlled.

Second and third servomechanisms 81 (FIG. 7) are mounted to the housing 35 above the side outlets 51. Pivot plates 83 are connected to the servomechanisms 81 to be pivoted thereby in the same manner as pivot plate 73. The plates 83 extend beyond either side of the servomechanisms 81 so that have two free ends. Rods 85 extend between and are pivotally connected to the ends of pivot plates 83 and the flange 63 of the thrusters 57 and 59. Preferably, there are two rods 85 for each thruster to facilitate rotation of the thruster. One rod is connected to either side of the thruster, as can be seen in FIG. 7. As with the rudder, when the servomechanisms 81 are operated to pivot the plates 83, each plate pulls one rod 85 and pushes the other. Thus, a plate pulls one side of the thruster upwardly and pushes the other side of the thruster downwardly to pivot the thruster. Preferably, the side thrusters are controlled in unison so that the outlets 61 will always face substantially the same direction (i.e., are at the same angle to the horizontal). Thus, one of the thrusters will not, for example, be generating a downward thrust while the other is generating an upward thrust, or for that matter, the two side thrusters will not be generating thrusts along two different vectors.

As noted above, the manifold 35 is not fixed to the axle 7. Rather, it can rotate about the axle 7. As the impeller 15 is rotated, it will generate a counter-rotation in the motor 13 in much the same way a helicopter rotor causes the fuselage of the helicopter to rotate when the tail rotor of the helicopter is not operating. The counter-rotation induced in the motor is passed on to the balloon 5 through the axle 7 and spokes 27. Thus, as the aircraft 1 is operated, the balloon spins or rotates on its axis in a rotational direction opposite that of the impeller. The spinning of the balloon will give the aircraft more stability, in the same way a spinning top is stabilized by rotation of the top. Because the housing 35 is not fixed to the axle 7, rotation that is passed to the balloon will not cause the housing to rotate.

Further, because the manifold or housing 35 rotates about the axle, the aircraft can be rotated in place. That is, it can turn a complete circle without requiring any forward momentum. Thus, by selective operation of the rudder, the manifold 35 can be rotated 180° to stop the forward motion of the aircraft. The ability for the housing to rotate about the axle similarly allows the aircraft to turn with substantially no forward motion. The aircraft 1 is thus highly maneuverable.

As variations within the scope of the appended claims may be apparent to those skilled in the art, the foregoing description is set forth only for illustrative purposes and is not meant to be limiting. For example, mechanisms other than servomechanisms can be provided to pivot the rudder and rotate the side thrusters. Pulley systems or pneumatic systems could be used in place of the servomechanism. More than three spokes can be used to connect the balloon to the hub. The spokes can be fixed directly to the hub, or can be telescopically received in bores in the hub. Other mechanisms, other than impeller induced counter-rotation can be used to rotate the balloon. For example, a gearing or pulley system can be used to rotate the balloon. This gearing or pulley system could be driven by the same motor which propels the aircraft, or a second motor could be provided to drive the gearing or pulley system. Other means could be used to mount the axle to the motor. For example, the axle could be welded to the motor mount. Because the side thruster create a generally forward thrust in their own right, the rear thruster could be removed and the rear outlet closed. The rudder could simply be mounted to the rear of the body portion, or rudders could be mounted in the outlets of the side thrusters. These examples are merely illustrative.

I claim:

1. A lighter-than-air aircraft including:
   a housing having an air inlet and at least one air outlet;
   an impeller in said housing operable to propel air through said outlet to drive said aircraft;
   a motor to drive said impeller, said impeller generating a counter-rotational force when rotated by said motor;
   a stem rotationally fixed to, and extending up from, said motor, said housing being rotatable relative to said stem; and
   a balloon mounted to said stem above said housing, said balloon being rotationally fixed with respect to said stem, said balloon being fillable with a lighter-than-air gas, said balloon being sized to accept sufficient amounts of said gas to make said aircraft buoyant, said counter-rotation being transmitted to said balloon to rotate said balloon in a direction opposite from said impeller when said impeller is operated.

2. The lighter-than-aircraft of claim 1 wherein said stem includes an annular lip spaced above said motor, said housing being operatively supported on said lip.

3. The lighter-than-air aircraft of claim 2 including a bearing, said shaft being journaled through said bearing, said bearing facilitating rotational movement of said housing relative to said stem.

4. The lighter-than-air aircraft of claim 1 wherein rotation of said impeller in one direction induces rotation of said stem in an opposite direction, whereby said balloon rotates counter to the rotation of said impeller when said aircraft is operated.

5. The lighter-than-air aircraft of claim 1 wherein counter-rotation of said stem does not induce rotation of said housing, said housing remaining substantially rotationally fixed during operation of said aircraft.

6. The lighter-than-air aircraft of claim 1 wherein said at least one air outlet includes a rear outlet having a tube defining a rear thruster, said tube including a rudder pivotally mounted to an end of said tube, said rudder being selectively pivotable to control the direction of movement of said aircraft.

7. The lighter-than-air aircraft of claim 6 including a servomechanism operably connected to said rudder, said servomechanism being selectively operable to control the pivotal position of said rudder.

8. The lighter-than-air aircraft of claim 6 wherein said at least one air outlet further includes two side outlets and tubes extending from said side outlets to define side thrusters, said tubes including an elbow and an outlet; the outlet of said side tubes being generally rearwardly facing.

9. The lighter-than-air aircraft of claim 8 wherein said side tubes are rotationally mounted to said body, said tubes being selectively rotatable to provide a desired amount of upward or downward thrust to said aircraft.

10. The lighter-than-air aircraft of claim 9 including a second servomechanism operatively connected to a first of said side tubes and a third servomechanism operatively connected to a second of said side tubes, said second and third servomechanisms being selectively operated to rotate said side tubes.

11. The lighter-than-air aircraft of claim 10 wherein said second and third servomechanisms are operated in unison such that said side tube outlets will provide the substantially the same thrust vectors to said aircraft.

12. A lighter-than-air aircraft including:
    a housing having an air inlet, at least one air outlet, and a top surface said top surface having an opening therein;
    a motor housed in said housing and having an impeller operable to propel air through said at least one air outlet of said housing to propel said aircraft in a forward direction, said motor including a motor mount and a post extending upwardly from said mount;
    a stem extending up from said motor and through said housing opening, said housing being rotatable about said stem, said stem including an annular lip spaced above said motor, said housing top being operatively supported on said lip, said stem being at least partially hollow to be telescopically received over said post; and
    a balloon mounted to said stem above said housing, said balloon being rotationally fixed with respect to said stem, said balloon being fillable with a lighter-than-air gas, said balloon being sized to accept sufficient amounts of said gas to make said aircraft buoyant.

13. The lighter-than-air aircraft of claim 12 including a pin which extends through said stem and said post to rotationally fix said stem relative to said post.

14. The lighter-than-air aircraft of claim 13 wherein said lip is a ring sized to fit about said stem, said pin extending through said ring to secure said ring in place on said stem.

15. A lighter-than-air aircraft including a body portion and a balloon portion; said balloon being fillable with a lighter-than-air gas and sized to accept sufficient amounts of said gas to make said aircraft buoyant;
    said body portion being supported beneath said balloon portion by a shaft, said balloon portion being rotationally fixed to said shaft and said shaft being rotationally journaled in said body, such that said balloon can rotate relative to said body portion, said body portion including an air inlet and an air outlet;
    an impeller in said body, said impeller being rotatable in a plane perpendicular to said axle, said impeller being operable to pull air into said body and exhaust air out said body to drive said aircraft; and
    a motor mounted to said shaft to drive said impeller, said impeller generating a counter-rotational in said motor when operated by said motor, said shaft being fixed to said motor;
    said balloon being operatively fixed to said motor via said shaft. said counter-rotation being transmitted to said balloon; whereby said balloon portion rotates in a direction opposite of said impeller when said aircraft is operated.

16. The lighter-than-air aircraft of claim 15 wherein said air outlet includes two side thrusters which face generally rearwardly; and said body including a rudder mounted to said body, said motor being operable to draw air in through said air inlet and to expel said air out said thrusters to propel said aircraft in a desired vector.

17. The lighter-than-air aircraft of claim 16 wherein said side thrusters are operable to alter an angle of said outlets relative to the horizontal to alter the altitude of said aircraft.

18. The lighter-than-air aircraft of claim 17 including a rear thruster, said impeller expelling air out said rear thruster to propel said aircraft forwardly, said rudder being mounted in said rear thruster.

19. The lighter-than-air aircraft of claim 15 wherein said motor induces rotation of said balloon, said motor being rotationally fixed to said axle and including an impeller which is rotationally driven by said motor, the rotation of said impeller creating a counter-rotation in said motor which is passed to said balloon portion without inducing rotation in said body portion.

* * * * *